(12) United States Patent
Nguyen et al.

(10) Patent No.: US 6,880,099 B1
(45) Date of Patent: Apr. 12, 2005

(54) METHOD AND APPARATUS NOT REQUIRING A CLOCK SIGNAL FOR SAMPLING AN INPUT SIGNAL

(75) Inventors: Hai Thanh Nguyen, San Jose, CA (US); Vuong Kim Le, Milpitas, CA (US); Sushma Chandrasekaran, Milpitas, CA (US); Yu-Sheng Yang, Cupertino, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 756 days.

(21) Appl. No.: 09/823,405

(22) Filed: Mar. 30, 2001

(51) Int. Cl.$^7$ ................................................. G06F 3/05
(52) U.S. Cl. ...................................... 713/502; 713/500
(58) Field of Search .............................. 713/400, 401, 713/500, 502; 327/3, 9, 31, 33

(56) References Cited

U.S. PATENT DOCUMENTS

| | | | |
|---|---|---|---|
| 6,218,823 B1 * | 4/2001 | Keeth | 323/313 |
| 6,232,802 B1 * | 5/2001 | Chang et al. | 327/59 |
| 6,448,821 B1 * | 9/2002 | Sakurai | 327/56 |
| 6,489,813 B2 * | 12/2002 | Kulhalli et al. | 327/77 |

* cited by examiner

*Primary Examiner*—Lynne H. Browne
*Assistant Examiner*—Paul Yanchus, III
(74) *Attorney, Agent, or Firm*—Brett A. Hertzberg; Merchant & Gould P.C.

(57) ABSTRACT

An input signal with an associated pulse width can be sampled using a sampling method that does not require a clock signal. The input signal is compared to a reference level signal to produce a comparator output signal. Strobe signals are generated from the input signal, where the strobe signals occur within a pulse width of the input signal. Sampled data points are generated in response to the comparator output signal and the strobe signals such that the sampled data points are within the pulse-width of the input signal. One of the strobe signals may be used to periodically reset the comparator. The sampling logic circuit may be constructed from common logic gates and memory circuits such as flip-flops. In one example application the sampling method is applied to an equalizer system. The equalizer system includes an equalizer circuit that produces an equalized signal. A data slicer circuit converts the equalized signal into a digital representation. The sampling method is applied to the output of the data slicer circuit to generate the sampled data points in the equalizer system. The sampled data points may be used in the equalizer system or any other system that requires samples of the input signal without the use of a clock signal. Since the sampling system uses the incoming data signal to generate the requisite timing signals for sampling, high frequency clock circuits and phase locked loop techniques are unnecessary resulting in lower power consumption and reduced costs.

20 Claims, 9 Drawing Sheets

METHOD AND APPARATUS NOT REQUIRING A CLOCK SIGNAL FOR SAMPLING AN INPUT SIGNAL

FIELD OF THE INVENTION

The present invention relates to a method and apparatus for sampling an input signal without the use of a clock signal. In particular, the present invention relates to a method and apparatus that generates timing signals from the input signal. The timing signals are used by a sampling circuit that produces sampled data points that correspond to samples from the input signal. The present invention may be used in a system such as an equalizer system that receives a data signal, samples the data signal and adjusts the equalization levels based on the sampled data.

BACKGROUND OF THE INVENTION

Data signals are degraded when transmitted over long lengths of cable. As the frequency of the data signal increases, the adverse effects on signal quality become more prevalent in the received signal. The data signal will become degraded in amplitude due to loss and phase dispersion from the cable.

Digital data signals consist of an infinite series of frequency components. High frequency digital data signals have very fast edges resulting in larger amplitudes in the high frequency components of the signal. Since the loss in the cable increases with frequency, the higher frequency components in fast edge digital data signals become greatly attenuated over distance when compared to the lower frequency components.

Equalization systems attempt to correct for high frequency losses and signal dispersion over cabling by boosting the higher frequency components of received data signals. High pass filters are used as equalizers to balance the frequency components of the received signal and attempt to reconstruct the fast edges found in the original data signal. The cable can be represented as a transfer function between the original signal and the received signal. By designing the high pass filter to have the inverse transform function of the cable's characteristics, the adverse effects of the cable loss can be eliminated.

The high pass equalization method may be represented as a simple capacitor and resistor network. Since the data signal is effectively AC coupled through the filter, a DC restore circuit is often required to recover a DC baseline for the incoming signal. DC servo circuits are often employed for this purpose. Once a proper DC level has been restored to the equalized signal, the data signal can be detected through a comparator circuit. The comparator and the DC restore circuit may be combined into a single circuit such as through the use of positive feedback from the output of the comparator. The output of such a comparator is a "sliced" version of the received data signal.

Phase locked loop and delay locked loop techniques may be used to provide adaptive equalization. The sliced data signal can be combined in a phase locked loop to adjust the high pass filter such that the transform function of the high pass filter closely matches the inverse transform of the cable.

SUMMARY OF THE INVENTION

In accordance with the present invention, a sampling system and method samples data points from an input signal without the use of a clock signal. The overall system operates at high speeds without the use of phase-locked loops and other complex methodologies, reducing cost and power consumption.

Briefly stated, the present invention relates to a sampling method that samples data points from an input signal that has an associated pulse-width, without the use of a clock signal. The input signal is compared to a reference level signal to produce a comparator output signal. Strobe signals are generated from the input signal, where the strobe signals occur within a pulse width of the input signal. Sampled data points are generated in response to the comparator output signal and the strobe signals such that the sampled data points are within the pulse-width of the input signal. One of the strobe signals may be used to periodically reset the comparator. The sampling logic circuit may be constructed from common logic gates and memory circuits such as flip-flops. In one example application the sampling method is applied to an equalizer system. The equalizer system includes an equalizer circuit that produces an equalized signal. A data slicer circuit converts the equalized signal into a digital representation. The sampling method is applied to the output of the data slicer circuit to generate the sampled data points in the equalizer system. The sampled data points may be used in the equalizer system or any other system that requires samples of the input signal without the use of a clock signal. Since the sampling system uses the incoming data signal to generate the requisite timing signals for sampling, high frequency clock circuits and phase locked loop techniques are unnecessary resulting in lower power consumption and reduced costs.

In accordance with a feature of the invention, a clock free apparatus samples an input signal that has a pulse-width defined between a first edge and a second edge. The apparatus includes a timing delay circuit that is arranged to produce strobe signals in response to the input signal such that the strobe signals have pulse-widths that are within the pulse-width of the input signal. A comparator circuit is arranged to produce a comparator output signal in response to a comparison between the input signal and a reference level signal. A sampling logic is arranged to sample data points within a sampling window in response to the strobe signals and the comparator output signal, the sampling window having edges that correspond to the pulse-width of the input signal such that the sampled data points correspond to samples from the comparator output signal.

In accordance with another feature of the invention, a method is directed to clock free sampling of an input signal that has a pulse-width defined between a first edge and a second edge. The method includes comparing the input signal to a peak level signal to produce a comparator output signal, generating a first and second timing signal from the input signal, wherein the first and second timing signals are within the pulse-width of the input signal, sampling a first data point from the comparator output in response to the comparator output signal, and sampling a second data point from the comparator output in response to a second timing signal, wherein the first and second data points correspond to sample points that are within the pulse-width of the input signal.

In accordance with yet another feature of the invention, an apparatus is directed to a clock free system for sampling an input signal that has a pulse-width defined between a first edge and a second edge. The system includes a means for producing data produces a data signal in response to the input signal, the data signal corresponding to a digital representation of the input signal. A means for producing a first timing signal produces a first timing signal in response to the data signal, wherein the first timing signal is a pulse that occurs a first time delay after a change in the data signal between a logic state and another logic state. A means for producing a second timing signal produces a second timing signal in response to the data signal, wherein the second timing signal is a pulse that occurs a second time delay after the data signal changes from the logic state to the other logic state, and the pulses of the first timing signal and the second timing signal are within the pulse-width of the input signal. A means for comparing produces a comparator output signal in response to a comparison between the input signal and a reference level signal. A means for sampling data points produces a first sampled data point in response the comparator output signal and the first and second strobe signals, the means for sampling also produces a second sampled data point in response to the comparator output signal and at least one of the first and second strobe signals, wherein the first and second sampled data points correspond to sampled data points within the pulse-width of the input signal.

Additionally, a means for analyzing determines a condition of the input signal by analyzing the first sample point and the second sample point. A means for determining persistence determines when the condition of the input signal becomes a persistent condition. The condition of the input signal may be an over-amplitude condition, an under-amplitude condition, an over-shoot condition, and an under-shoot condition. The condition of the input signal is persistent when the condition has continued for a predetermined number of consecutive occurrences. Furthermore, a means for increasing an equalization level that increases the equalization level of the means for equalizing when the under-shoot condition is persistent, and a means for decreasing the equalization level that decreases the equalization level of the means for equalizing when the over-shoot condition is persistent. A means for increasing the peak level signal may be employed to increase the peak level signal when the under-amplitude condition is persistent, while a means for decreasing the peak level signal may be employed to decrease the peak level signal when the over-amplitude condition is the persistent condition.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal.

The present invention relates to a data receiver that receives an input signal and produces sampled data points from the received input signal. A reference level generator (or generators) produces a reference level (or levels). A comparator is used to compare a received input signal with the reference level. The output of the comparator is used to generate sample data points from the received/equalized input signal. The sample data points correspond to data points that are sampled from the input signal.

Figure 1:
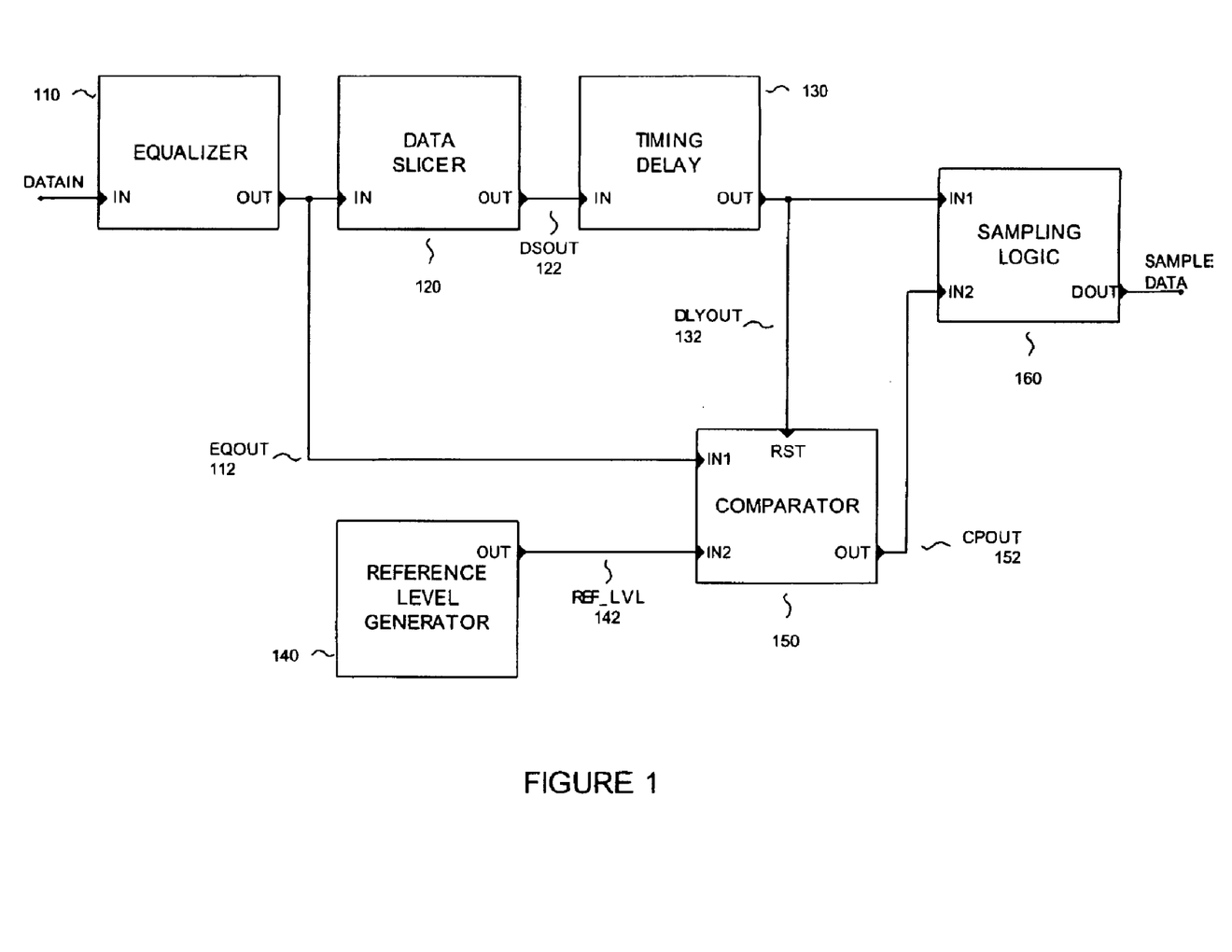
FIG. 1 is a schematic diagram of a sampling system.

FIG. 1 shows a schematic of an exemplary sampling system that is in accordance with the present invention. As shown in the figure, the system includes an equalizer (110), a data slicer (120), a timing delay (130), a reference generator (140), a comparator (150), and a sampling logic (160).

The equalizer (110) includes an input terminal (IN) and an output terminal (OUT). The equalizer receives a data signal (DATAIN) through the input terminal (IN). The equalizer produces an output signal (EQOUT, 112) through the output terminal (OUT). The equalizer (110) may optionally be controlled by a control signal (not shown) to vary the shape of the differential output signal (EQLO, EQHO). The shape of the output signal (EQOUT, 112) corresponds to a shaped version of the data signal (DATAIN).

The data slicer (120) includes an input terminal (IN) and an output terminal (OUT). The input terminal (IN) of the data slicer (120) receives the output of the equalizer (EQOUT, 112), and couples an output signal (DSOUT, 122) to the output terminal (OUT) of the data slicer (120). The output (DSOUT, 122) of the data slicer (120) corresponds to data that is extracted from the output signal of the equalizer (EQOUT, 112).

The timing delay (130) includes an input terminal (IN) and an output terminal (OUT). The input terminal (IN) of the timing delay (130) receives the output of the data slicer (DSOUT, 122). The timing delay (130) produces one or more timing signals that are coupled to the output terminal (OUT) of the timing delay (130) as DLYOUT (132). The timing signal (DLYOUT) or signals are used as strobe signals for sampling in other circuits.

The reference generator (140) produces an output signal (REF_LVL, 142) through an output terminal (OUT). The reference level (REF_LVL) may optionally be adjusted by a control signal (not shown).

The comparator (150) includes two input signal terminals (IN1, IN2), a reset control terminal (RST), and an output terminal (OUT). The first input signal terminal (IN1) receives the output signal (EQOUT, 112) from the equalizer (110). The second input signal terminal (IN2) receives the output signal (REF_LVL, 142) from the reference level generator (140). The reset control terminal (RST) receives the output signal (DLYOUT, 132) from the timing delay (130). The comparator (150) produces an output signal (CPOUT, 152) through its corresponding output terminal (OUT). When the reset control terminal is not active (RST not active), the comparator output signal (CPOUT, 152) corresponds to a comparison between the EQOUT signal (112) and the REF_LVL signal (142).

The sampling logic includes two input terminals (IN1, IN2) and an output terminal (DOUT). One of the input terminals (IN1) receives the output signal (DLYOUT, 132) from the timing delay (130). The other of the input terminals (IN2) receives the output signal (CPOUT, 152) from the comparator (150). The sampling logic produces sampled data points (SAMPLE DATA) in response to the input signals (DLYOUT, CPOUT).

Figure 2:
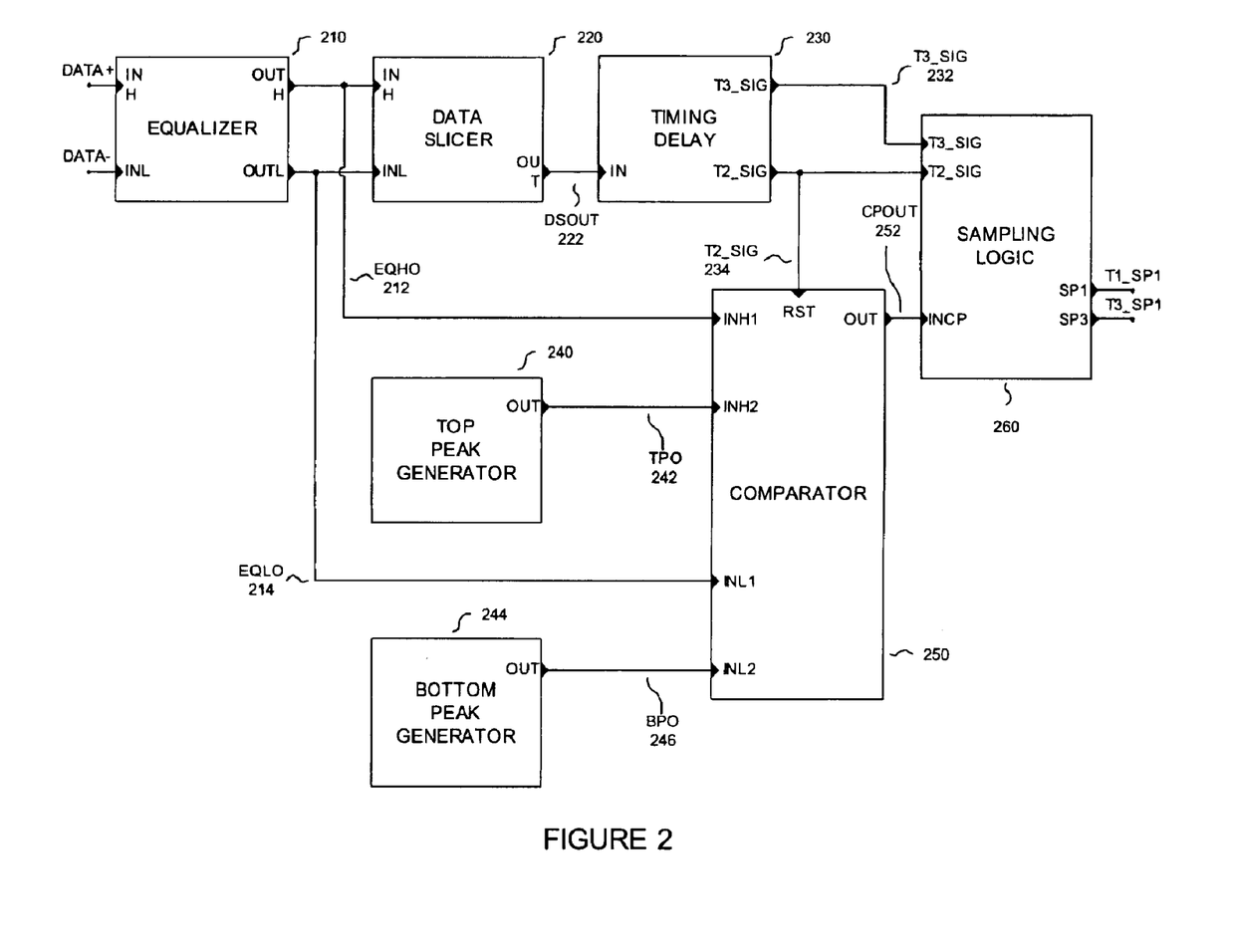
FIG. 2 is a schematic diagram of another sampling system.

FIG. 2 shows another example schematic of an exemplary sampling system that is in accordance with the present invention. As shown in the figure, the system includes an equalizer (210), a data slicer (220), a timing delay (230), a top peak generator (240), a bottom peak generator (244), a comparator (250), and a sampling logic (260).

The equalizer (210) includes a pair of input terminals (INH, INL), and a pair of output terminals (OUTH, OUTL). The equalizer receives a differential data signal (DATA+, DATA−) through the input terminals (INH, INL). The equalizer produces a differential output signal (EQHO, EQLO) through the output terminals (OUTH, OUTL). The equalizer may optionally be controlled by a control signal (not shown) to vary the shape of the differential output signal (EQLO, EQHO). The shape of the differential output signal (EQHO, EQLO) corresponds to a shaped version of the differential data signal (DATA+, DATA−).

The data slicer (220) includes a pair of input terminals (INH, INL) and an output terminal (OUT). The input terminals (INH, INL) of the data slicer (220) receive the output signals (EQHO, EQLO) from the equalizer (210), and couples an output signal (DSOUT, 222) to the output terminal (OUT) of the data slicer (220). The output (DSOUT, 222) of the data slicer (220) corresponds to data that is extracted from the output differential signal (EQHO, EQLO) of the equalizer (210).

The timing delay (230) includes an input terminal (IN) and a pair of output terminals (T2_SIG, T3_SIG). The input terminal (IN) of the timing delay (230) receives the output of the data slicer (DSOUT, 222). The timing delay (230) produces one or more timing signals that are coupled to the output terminals of the timing delay (230) as T2_SIG (234) and T3_SIG (232). The timing signals (T2_SIG, T3_SIG) are used as strobes signals in the sampling circuit (260).

The top peak generator (240) is arranged to provide a top peak level (TPO, 242) through an output terminal (OUT). The bottom peak generator (244) is arranged to provide a bottom peak level (BPO, 246) through an output terminal (OUT). The top peak level (TPO) may optionally be adjusted by a top peak control signal (not shown). The bottom peak level (TPO) may optionally be adjusted by a bottom peak control signal (not shown).

The comparator (250) includes four input signal terminals (INH1, INH2, INL1, INL2), a reset control terminal (RST), and an output terminal (OUT). The first input signal terminal (INH1) receives the top output signal (EQHO, 212) from the equalizer (210). The second input signal terminal (INH2) receives the output signal (TPO, 242) from the top peak generator (240). The third input signal terminal (INL1) receives the bottom output signal (EQLO, 214) from the equalizer (210). The fourth input signal terminal (INL2) receives the output signal (BPO, 246) from the bottom peak generator (244). The reset control terminal (RST) receives the output signal (T2_SIG, 234) from the timing delay (230). The comparator (250) produces an output signal (CPOUT, 252) through its corresponding output terminal (OUT). When the reset control terminal is not active (RST not active), the comparator block (250) outputs a signal (CPOUT) corresponding to the comparison of the differential equalized signal (EQHO, EQLO) and the differential amplitude levels (TPO, BPO).

The sampling control logic (260) includes three input terminals (T2_SIG, T3_SIG, INCP), and two output terminals (SP1, SP3). The T2_SIG and T3_SIG input terminals receive the T2_SIG output signal (234) and the T3_SIG output signal (232) from the timing delay (230). The INCP input terminal receives the output signal (CPOUT, 252) from the comparator (250). The digital control logic produces control signals in response to the input signals (T2_SIG, T3_SIG, CPOUT).

As shown in FIGS. 1 and 2, equalization is performed on an incoming signal. Equalization is performed to compensate for loss of amplitude, shift in phase, as well as other effects such as noise on the incoming signal. The sampling logic shown in FIGS. 1 and 2 sample the equalized signal to generate sample points (T1_SP1, T3_SP1). The sample points may be analyzed to determine any amount of undershoot, overshoot, over-amplitude, and under-amplitude that occurs in the output of the equalizer. Other circuitry (not shown) may be utilized to adjust the equalizer for optimal performance. The other circuitry may analyze the sampled data points from the output of the equalizer to determine the condition of the equalized data-signal (i.e. undershoot, overshoot, etc.).

Two points may be sampled from the equalizer output to determine the condition of the equalized data-signal. FIGS. 3–6 illustrate exemplary equalized signals (i.e. EQOUT 112 in FIG. 1), and corresponding output signals from the comparator (i.e. CPOUT 152 in FIG. 1). FIGS. 3–6 include an ideal data signal shown as a voltage waveform that varies over time. Sample points P1 and P2 are evaluation points for the comparator at times T1 and T3 respectively. The comparator outputs follow after the comparisons are made at times T1 and T3. For simplicity, changes in the output of the comparator will simply be referred to as "at time T1" or "at time T3".

Figure 3:
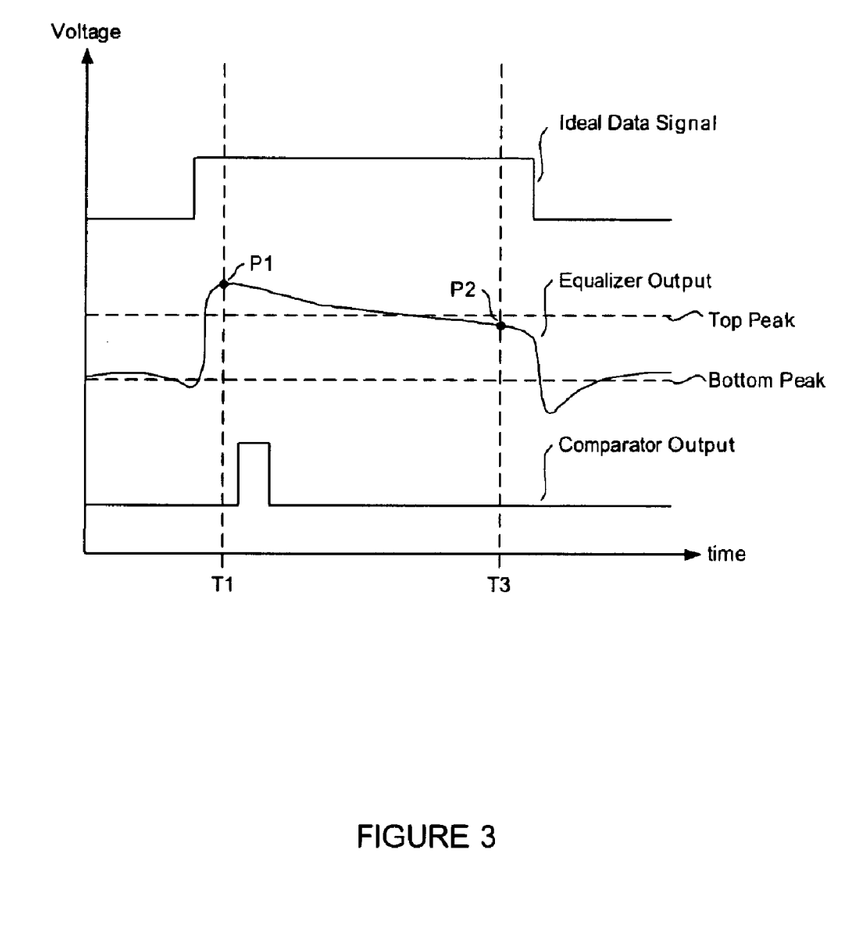
FIG. 3 is a graph of waveforms related to an over-equalized signal.

FIG. 3 illustrates an equalized signal that has excessive amounts of overshoot (over-equalized). The output of the equalizer overshoots the top peak level as shown by sample point P1 at time T1. At time T3, the signal drops to a level below the top peak level as shown by sample point P2. The comparator output level at time T1 is a high logic level, while the comparator output level at time T3 is a low logic level. Overshoot may be caused by excessive amounts of gain in the equalizer as well as other causes that are known to one of ordinary skill in the art having read the above discussion.

Figure 4:
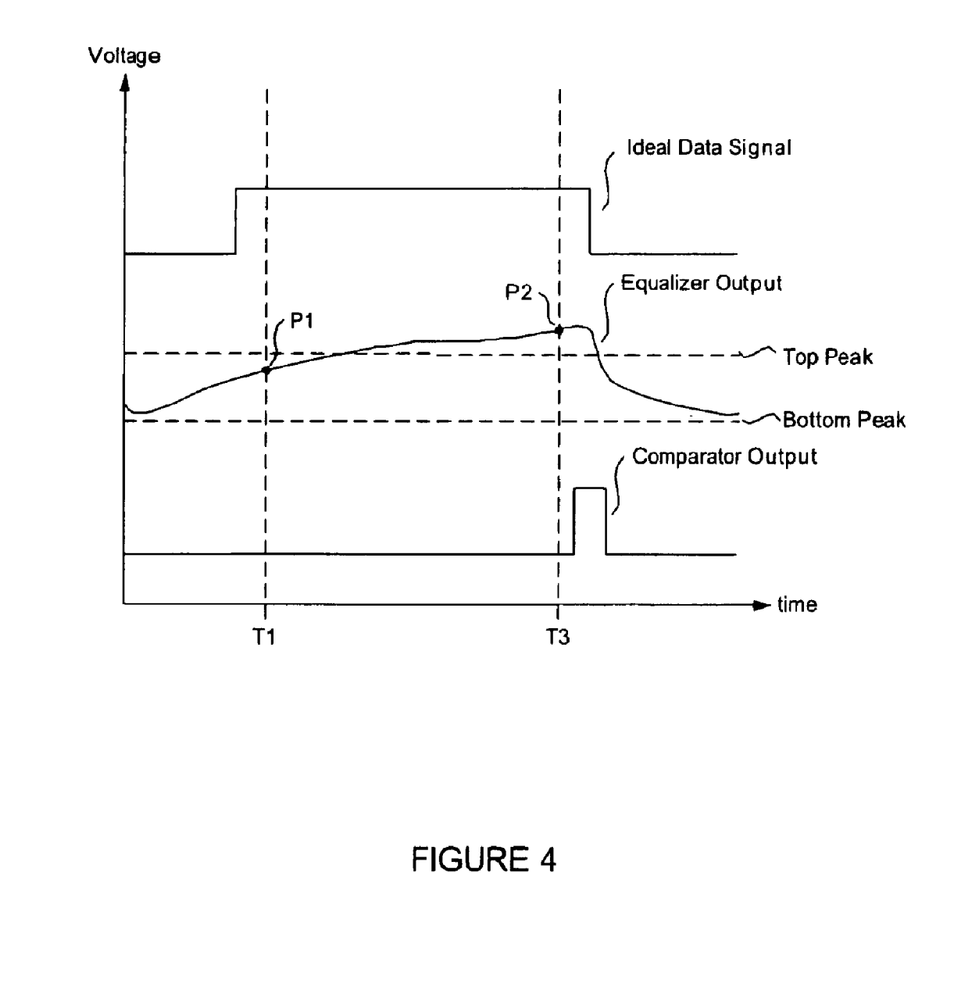
FIG. 4 is a graph of waveforms related to an under-equalized signal.

FIG. 4 illustrates an equalized signal that is under-equalized as shown by excessive amounts of undershoot. The output of the equalizer undershoots (does not reach) the top peak level as shown by sample point P1 at time T1. At time T3, the signal exceeds the top peak level as shown by sample point P2. The comparator output level at time T1 is a low logic level, while the comparator output level at time T3 is a high logic level. Undershoot may be caused by insufficient amounts of gain in the equalizer as well as other causes that are known to one of ordinary skill in the art having read the above discussion.

Figure 5:
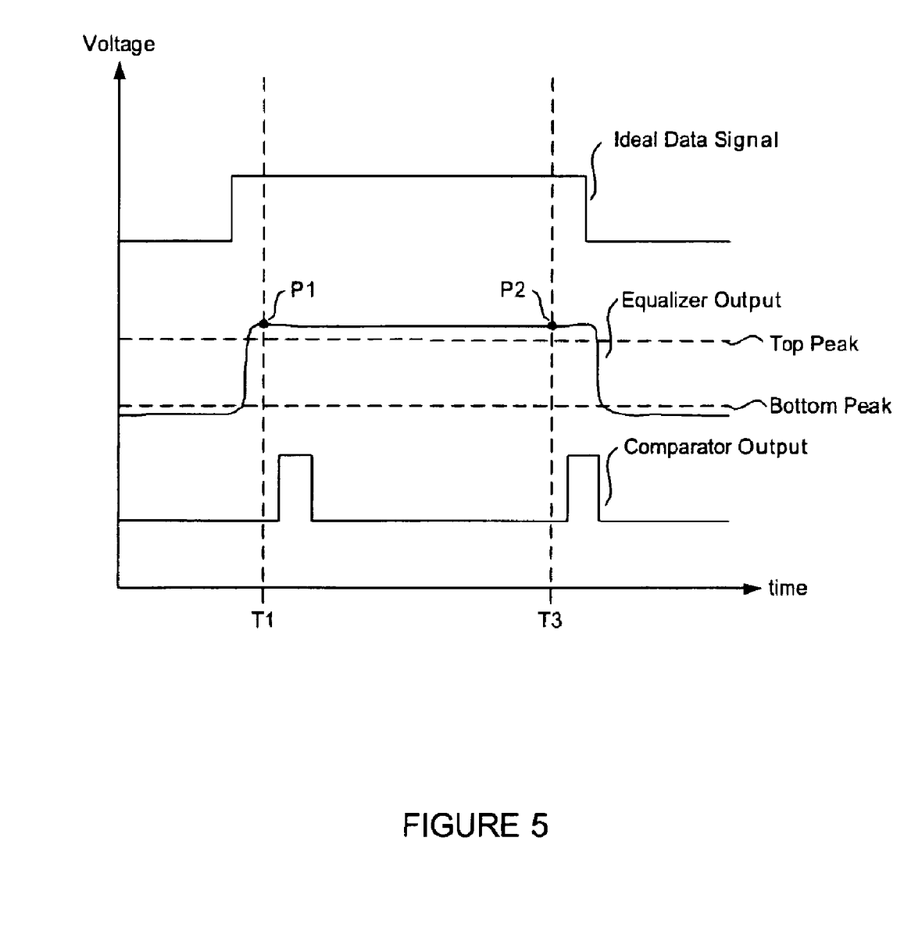
FIG. 5 is a graph of waveforms related to an over-amplitude adjusted signal.

FIG. 5 illustrates an equalized signal that has excessive amounts of amplitude (over-amplitude). The output of the equalizer exceeds the top peak level at times T1 and T3 as shown by sample points P1 and P2. The comparator will output a high logic levels at times T1 and T3. In this instance, the peak levels may be appropriately adjusted for maximum signal size.

Figure 6:
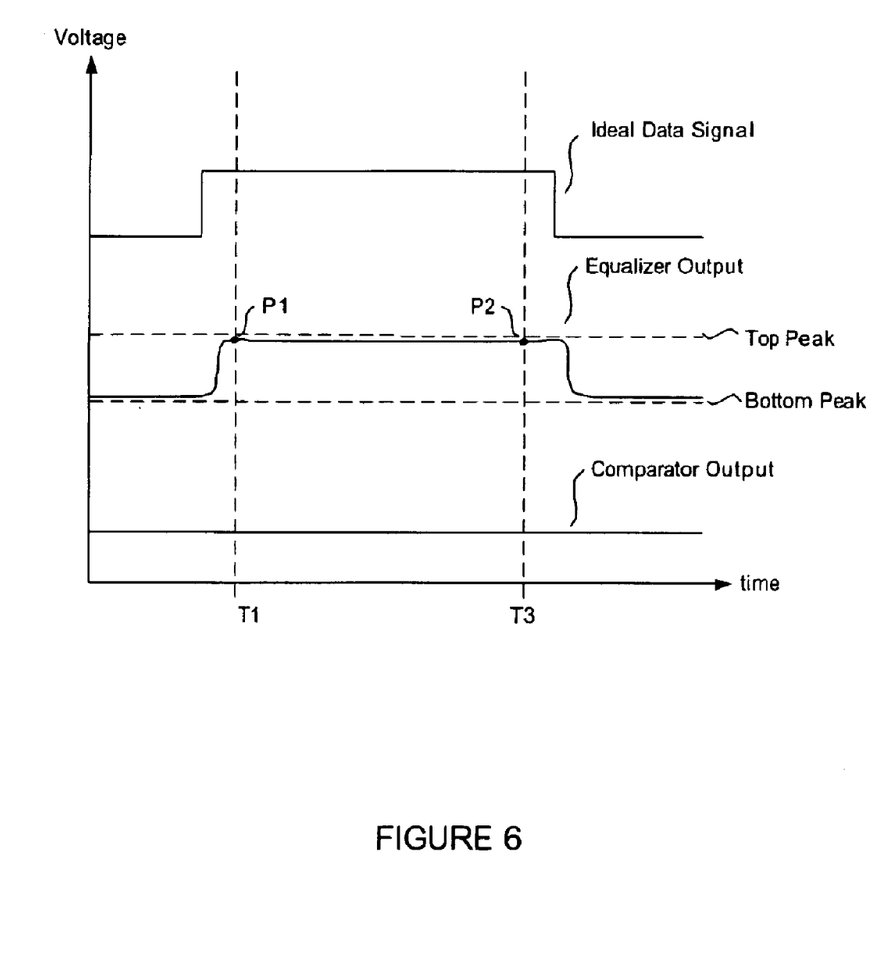
FIG. 6 is a graph of waveforms related to an under-amplitude adjusted signal.

FIG. 6 illustrates an equalized signal that has insufficient amplitude levels (under-amplitude). The output of the equalizer fails to exceed the top peak level at times T1 and T3 as shown by sample points P1 and P2. The comparator will output a low logic levels at times T1 and T3. As with case of over-amplitude signals, the peak levels should be appropriately adjusted for maximum signal size.

The data slicer shown in FIGS. 1 and 2 operate similar to a comparator that converts an analog waveform into a digital waveform. The data slicer receives a signal from the output of the equalizer and outputs a signal that has the same duty cycle and distortion of the equalized signal in digital form. The data slicer can be designed using comparators, inverters, as well as other combinations of analog and digital electronic devices that are configured to convert an analog signal to a digital logic signal. In one example of the present invention, the data slicer receives a differential analog signal and converts the differential analog signal to a differential digital signal. In another example of the present invention, the data slicer receives a differential analog signal and converts the differential analog signal to a single ended digital signal. In light of the above discussion, other arrangements for the data slicer are possible without departing from the scope of the invention.

The timing delay block produces strobe signals that are used by the sampling control logic and the comparator. As shown in FIG. 2, two strobe signals (T2_SIG and T3_SIG) are generated by the timing delay cell (230). The strobe signals are used to sample data from the equalized signal as described with reference to FIGS. 3–6. In one embodiment of the present invention, the frequency of the T3_SIG strobe signal is approximately the same as the output signal from the data slicer, and the frequency of the T2_SIG signal is approximately twice that of the output signal from the data slicer. The pulse-widths of the T2_SIG and T3_SIG signals are fixed widths that are narrower than the incoming signal pulse-width. The pulse-widths of the T2_SIG and T3_SIG signals need not be the same as one another.

The T2_SIG pulse occurs a fixed interval after the data signal changes from one logic level to another. In one embodiment, the T2_SIG pulses low for a fixed interval after the output signal from the data slicer changes logic states. The T2_SIG pulse can be generated by various methods including but not limited to combinational logic combined with skewed inverter/delay circuits. The T3_SIG pulse is generated in a similar way as T2_SIG. In one embodiment, the T3_SIG signal pulses from a logic low to a logic high a time interval after the output signal from the data slicer changes from a high logic level to a low logic level.

The comparator block receives a periodic reset pulse from the T2_SIG signal of the timing delay block. In one example, the comparator output is reset to a low logic level after receiving a low logic level reset pulse. While the reset pulse is inactive (high logic level), the comparator compares the input signals to the comparator and provides a logic output corresponding to the comparison. In one example, the inputs to the comparator (e.g., EQOUT and REF_LVL) are single ended logic signals such as shown in FIG. 1. In another example, the inputs to the comparator (e.g. EQHO, EQLO and TPO, BPO) are differential signals and the comparator performs a differential comparison to determine the output logic signal such as shown in FIG. 2.

Figure 7:
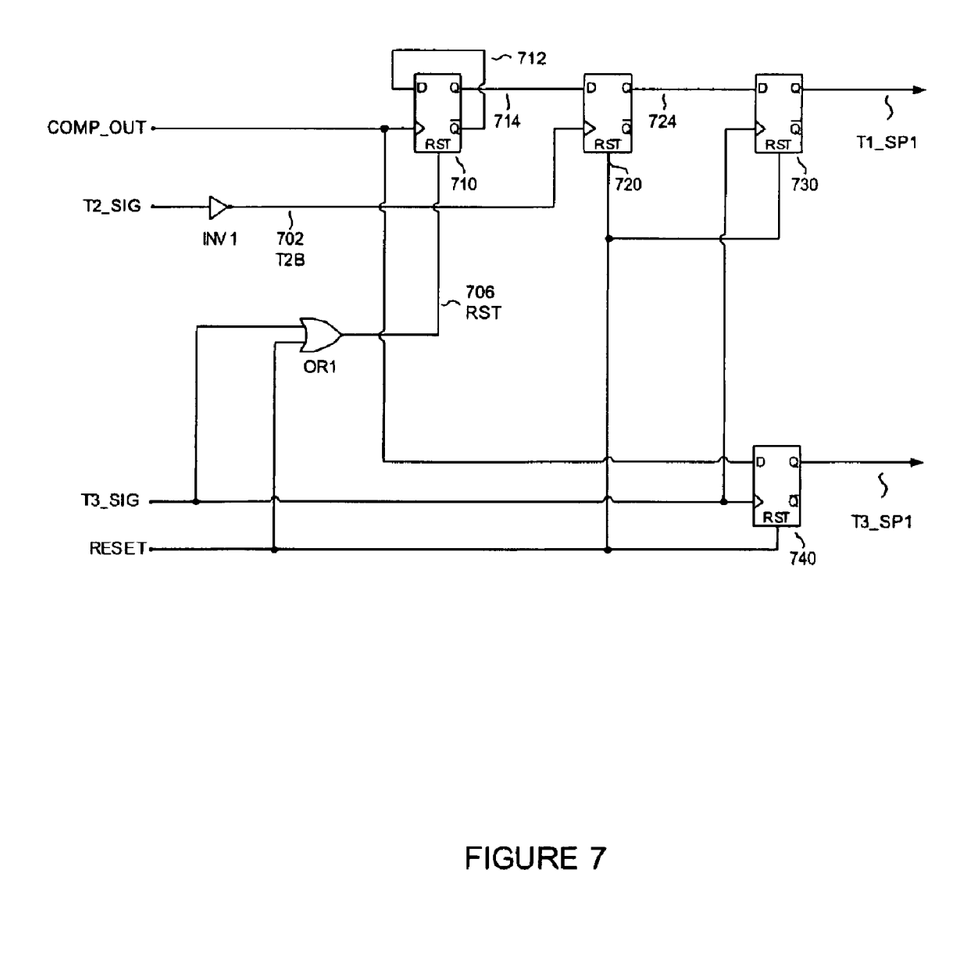
FIG. 7 is a schematic of sampling logic in an equalization system.

In accordance with the present invention, an exemplary sampling logic block is shown in FIG. 7. The sampling logic block uses the timing signals (e.g., T2_SIG and T3_SIG) signals together with the output signal from the comparator (COMP_OUT) to generate sample data points (T1_SP1, T3_SP1). The exemplary sampling logic includes four flip-flop circuits (710–740), each having a D input, a clock input, a reset input (RST), and Q and NQ output terminals. The sampling logic also includes an inverter (INV1) and a logical OR gate (OR1) to generate signals for controlling the flip-flops (710–740). The first inverter (INV1) produces a first signal (702, T2B) from a first timing signal (T2_SIG). The logical OR gate (OR1) produces another reset signal (706, RST) from the reset signal (RESET) and a second timing signal (T3_SIG).

The first flip-flop (710) is arranged with a data signal (COMP_OUT) coupled to the clock input, the NQ output (712) is coupled to the D input, and the RST input is coupled to a first reset signal (706, RS1). The Q output (714) from the first flip-flop (710) is coupled to the D input of the second flip-flop (720). The second flip-flop (720) is arranged with an inverted version of the T2_SIG timing signal (702, T2B) coupled to the clock input, and the reset signal (RST) is coupled to the reset signal (RESET). The Q output (724) from the second flip-flop (720) is coupled to the D input of the third flip-flop (730). The third flip-flop (730) is arranged with the second reset signal (RST) coupled to the reset signal (RESET), and the second timing signal (T3_SIG) is coupled to the clock input. The Q output (T1_SP1) of the third flip-flop (730) serves as an output signal corresponding to the first sample point discussed previously. The fourth flip-flop (740) is arranged with the data signal (COMP_OUT) coupled to the D input, the second timing signal (T3_SIG) coupled to the clock input, and the reset signal (RESET) coupled to the RST input. The Q output (T3_SP1) of the fourth flip-flop (740) serves as an output signal corresponding to the second sample point discussed previously. The data signal (COMP_OUT) shown in FIG. 7 corresponds to an output from a comparator such as the comparators shown in FIGS. 1 and 2.

The first flip-flop (710) is used to sample the first data point from the incoming signal. The second flip-flop (720) is used to store the first sampling point so that the first flip-flop (710) can be reset by the second timing signal (T3_SIG). The third flip-flop (730) is used to synchronize the first sampling point with the second timing signal (T3_SIG) so that the first and second sampling points appear at their respective outputs (T1_SP1, T3_SP1) at the same time. The fourth flip-flop (740) is used to sample the second sampling point.

The RESET signal is held at a high logic level in order to initialize the sampling circuit. The RST will be a high logic level during initialization, causing all four flip-flops (710–740) to be reset such that the Q outputs are reset to a low logic level. In one example of the present invention, the RESET signal pulses high when it is desired to initialize the logic under a power-on-reset condition. In another example, the RESET signal pulses high periodically to reinitialize the equalizer and amplitude adjustments. The operation of the circuit shown in FIG. 7 will proceed under normal operation after the RESET signal changes to a low logic level.

During normal operation, the output of the comparator (COMP_OUT) is used to clock the first flip-flop (710). By using the comparator output to clock the flip-flop, the first sampling point is as close as possible to the transition of the incoming data. After initialization (flip-flops are reset), the first transition from low to high in the incoming signal (COMP_OUT) will cause the Q output (714) of the first flip-flop (710) to change from a low logic level to a high logic level. The operation of the flip-flops (710–740) will now be discussed with reference to FIGS. 8–9.

Figure 8:
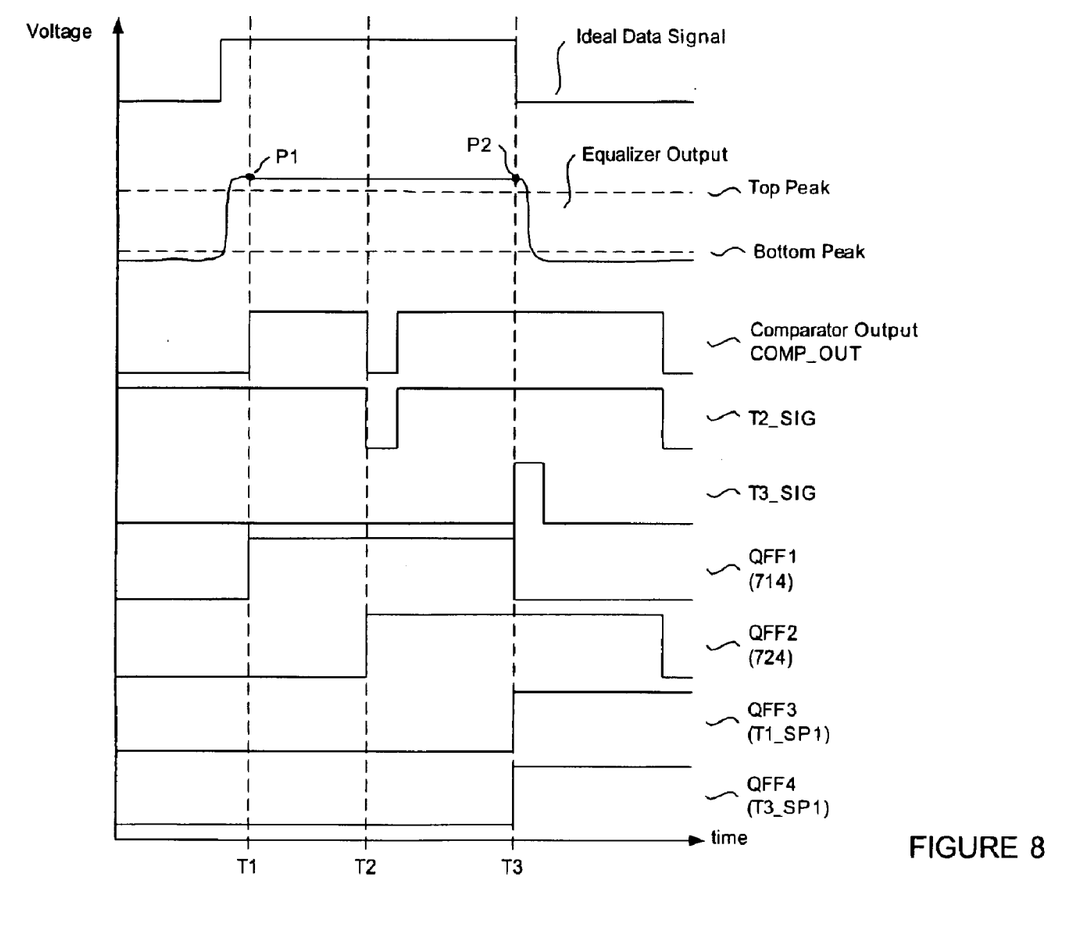
FIG. 8 is a graph of waveforms related to the sampling logic shown in FIG. 7.

In FIG. 8, the output of the equalizer is higher than the top peak level at times T1, T2 and T3. Initially, all of the flip-flops (710–740) are reset causing the Q outputs (714, 724, T1_SP1, T3_SP1) to set to a low logic level. At time T1, the comparator output (COMP_OUT) transitions from low to high causing the first flip-flop (710) to set the Q output (714) to a logic high signal. A short time after the transition of the equalizer output signal (at time T2), the timing signal T2_SIG pulses from high to low, causing the second flip-flop (720) to latch the first sampled data point (714) to the Q output (724). At time T3 the equalizer output change from a high level to a low level and the T3_SIG timing signal pulses from low to high for a fixed time interval. The T3_SIG pulse causes the first flip-flop (710) to reset the output (714) to a low logic level, and the Q output (724) of the second flip-flop (720) is latched into the Q output (T1_SP1) of the third flip-flop (730). At the same time the T3_SIG pulse causes the fourth flip-flop to latch the comparator output (which is still high) into the Q output (T3_SP1) of the fourth flip-flop (740). A short time after the equalizer output transitions from a high level to a low level, the T2_SIG timing signal will pulse low again, causing the second flip flop (720) to set the Q output (724) to a low logic level, and simultaneously resetting the comparator output to a low logic level.

In FIG. 8, both points P1 and P2 of the Equalizer Output signal are above the top peak level. By using the sampling circuit previously described, sample points T1_SP1 and T3_SP1 both correspond to a logic high level at time T3. Thus, sample points T1_SP1 and T3_SP1 match with the fact that Equalizer Output signal is above the top peak level at both times T1 and T3. In other words, the sampling circuit functions as a means of translating the condition of the equalized data signal to a logic high or low as reflected by sampling points T1_SP1 and T3_SP1. Sampling points T1_SP1 and T3_SP1 may be used to determine if a particular condition occurs.

Figure 9:
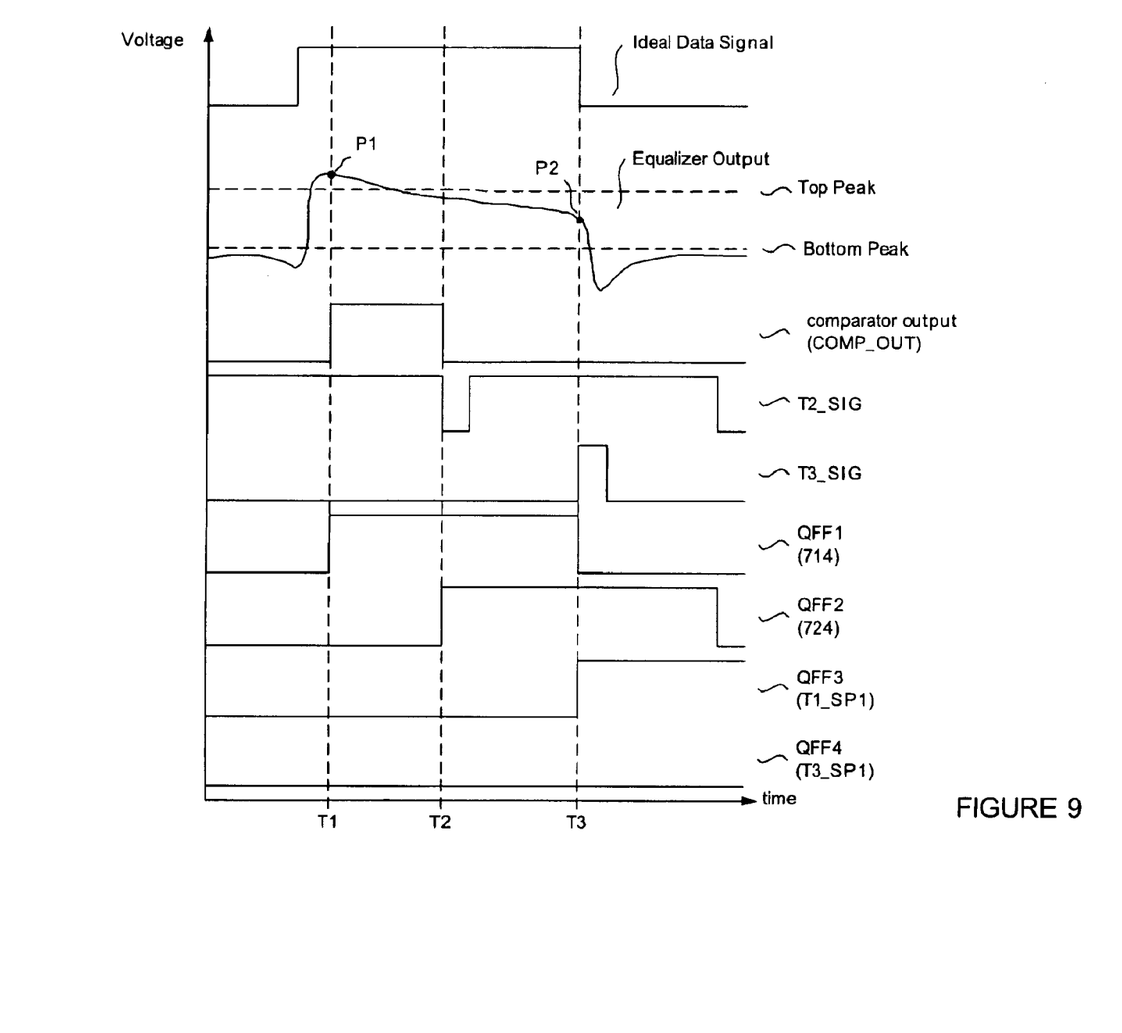
FIG. 9 is another graph of waveforms related to the sampling logic shown in FIG. 7, in accordance with the present invention.

In FIG. 9, the output of the equalizer (Equalizer Output) is higher than the top peak level at time T1, and lower than the top peak at times T2 and T3. Initially, all of the flip-flops (710–740) are reset causing the Q outputs (714, 724, T1_SP1, T3_SP1) to set to a low logic level. At time T1, the comparator output (COMP_OUT) transitions from low to high causing the first flip-flop (710) to set the Q output (714) to a logic high signal. A short time after the equalizer output signal drops below the top peak level (at time T2), the timing signal T2_SIG pulses from high to low, causing the second flip-flop (720) to latch the first sampled data point (714) to the Q output (724). At time T3 the equalizer output signal further drops from a high level to a low level and the T3_SIG timing signal pulses from low to high for a fixed time interval. The T3_SIG_pulse causes the first flip-flop (710) to reset the output (714) to a low logic level, and the Q output (724) of the second flip-flop (720) is latched into the Q output (T1_SP1) of the third flip-flop (730). At the same time, the T3_SIG pulse causes the fourth flip-flop to latch the comparator output (which is low) into the Q output (T3_SP1) of the fourth flip-flop (740). A short time after the equalizer output transitions from a high level to a low level, the T2_SIG timing signal will pulse low again, causing the second flip flop (720) to set the Q output (724) to a low logic level, and simultaneously resetting the comparator output to a low logic level.

In FIG. 9, point P1 shows that Equalizer Output signal is above the top peak level and point P2 shows that Equalizer Output signal is below the top peak level. By using the sampling circuit previously described, T1_SP1 corresponds to a logic high level at time T3 and T3_SP1 corresponds to a logic low level at time T3 respectively. Thus, sample points T1_SP1 and T3_SP1 match with the fact that Equalizer Output signal is above top peak level at time T1 and below top peak level at time T3. In other words, the sampling circuit functions as a means of translating the condition of the equalized data signal to a logic high or low as reflected by sampling points T1_SP1 and T3_SP1. Sampling points T1_SP1 and T3_SP1 may be used to determine if a particular persistent condition occurs.

Each time the incoming data (COMP_OUT) transitions from low to high, the Q output (714) of the first flip-flop (710) will change to a high logic level. The sampling window is maximized by sampling the comparator output signal instead of using another timings signal to latch the comparator output. The sampling window is defined as the time interval between the positive edge of the data signal at time T1 and the rising edge of the T3_SIG timing signal. Since the circuit utilizes pulse signals T2_SIG and T3_SIG that are generated from the incoming signal, the equalizer system uses less power without the need for a high frequency clock generator. The flip-flops used in the sampling circuit consume very little power, have low set-up and hold times, and need not be high speed. Standard cell flip-flops and logic can be used allowing the equalizer design to be scalable.

The sampling points (T1_SP1, T3_SP1) from a sampling circuit such as shown in FIG. 7 are used to algorithmically determine adjustments to equalizer gain and amplitude settings in the equalizer system. By collecting the sample data (T1_SP1, T3_SP1), the equalizer control logic makes decisions on equalization control based on an averaging algorithm. Similarly, the amplitude control logic makes decisions on amplitude control based on another averaging algorithm.

The above specification, examples and data provide a complete description of the manufacture and use of the composition of the invention. Since many embodiment of the invention can be made without departing from the spirit and scope of the invention, the invention resides in the claims hereinafter appended.

We claim:

1. A clock free apparatus for sampling an input signal that has a pulse-width defined between a first edge and a second edge, comprising:

a timing delay circuit arranged to produce at least two strobe signals in response to the input signal such that the at least two strobe signals each have a corresponding pulse width that are no greater than the pulse-width associated with the input signal;

a comparator circuit arranged to produce a comparator output signal in response to a comparison between the input signal and a reference level signal; and a sampling logic arranged to sample at least two data points within a sampling window in response to the at least two strobe signals and the comparator output signal, the sampling window having edges that correspond to the pulse-width of the input signal such that the at least two sampled data points correspond to at least two samples from the comparator output signal over the time period associated with the pulse-width of the input signal.

2. A clock free apparatus as in claim 1, wherein the input signal is a differential input signal, the reference level signal is a differential peak level signal, and the comparator circuit is arranged to produce the comparator output signal in response to a comparison between the differential input signal and the differential peak level signal.

3. A clock free apparatus as in claim 1, wherein the input signal is a differential input signal that includes a top input signal and a bottom input signal, the reference level signal is a differential peak level signal that includes a top peak level signal and a bottom peak level signal, and the comparator circuit is arranged such that the comparator output signal is a first logic level when the top input signal exceeds the top peak level signal, the comparator output signal is the first logic level when the bottom input signal drops below the bottom peak level signal, and the comparator output signal is a second logic level that is different from the first logic level when the top equalized signal is below the top peak level signal and the bottom equalized signal is above the bottom peak level signal.

4. A clock free apparatus as in claim 1, further comprising a top peak generator circuit and a bottom peak generator circuit, wherein the input signal is a differential input signal including a top input signal and a bottom input signal, the reference level signal is a differential peak level signal including a top peak level signal and a bottom peak level signal, and the top peak level signal is produced by the top peak generator circuit and the bottom peak level signal is produced by the bottom peak generator circuit.

5. A clock free apparatus for sampling an input signal that has a pulse-width defined between a first edge and a second edge, comprising:
   a timing delay circuit is arranged to produce strobe signals in response to the input signal such that the strobe signals have pulse-widths that are within the pulse width of the input signal;
   a comparator circuit is arranged to produce a comparator output signal in response to a comparison between the input signal and a reference level signal; and
   a sampling logic is arranged to sample data points within a sampling window in response to the strobe signals and the comparator output signal, the sampling window having edges that correspond to the pulse-width of the input signal such that the sampled data points correspond to samples from the comparator output signal, wherein the strobe signals generated by the timing delay circuit include a first strobe signal and a second strobe signal, the first strobe signal is a first logic pulse that is responsive to rising and falling edges of the input signal, and the second strobe signal is another logic pulse that occurs a predetermined time delay after one of the rising and falling edges of the input signal such that the logic pulse and the another logic pulse occur within the pulse-width of the input signal.

6. A clock free apparatus as in claim 5, wherein the comparator circuit includes a reset control input that is coupled to the first strobe signal such that the output of the comparator is periodically reset to a first logic level, and the output of the comparator indicates a second logic level that is different from the first logic level when the input signal exceeds the reference level signal.

7. A clock free apparatus as in claim 5, the sampling logic further comprising:

a first logic circuit arranged to produce a first output signal that is periodically reset to a first logic level in response to the second strobe signal, wherein the first output signal toggles between the first logic level and the second logic level in response to the comparator output signal;
   a second logic circuit arranged to produce a second output signal that follows the first output signal in response to the first strobe signal;
   a third logic circuit arranged to produce a third output signal that follows the second output signal in response to the second strobe signal, wherein the third output signal corresponds to a first of the sampled data points; and
   a fourth logic circuit arranged to produce a fourth output signal that follows the output of the comparator in response to the second strobe signal, wherein the fourth output signal corresponds to a second of the sampled data points.

8. A clock free apparatus as in claim 1, wherein the at least two sampled data points indicate a condition of the input signal that corresponds to at least one of an under-shoot condition, an over-shoot condition, an under-amplitude condition, and an over-amplitude condition.

9. A clock free apparatus for sampling an input signal that has a pulse-width defined between a first edge and a second edge, comprising:
   a timing delay circuit is arranged to produce strobe signals in response to the input signal such that the strobe signals have pulse-widths that are within the pulse width of the input signal;
   a comparator circuit is arranged to produce a comparator output signal in response to a comparison between the input signal and a reference level signal; and
   a sampling logic is arranged to sample data points within a sampling window in response to the strobe signals and the comparator output signal, the sampling window having edges that correspond to the pulse-width of the input signal such that the sampled data points correspond to samples from the comparator output signal, wherein the sampled data points include a first sampled data point and a second sampled data point, the first sampled data point corresponding to a sample of the comparator output signal after the first edge of the input signal, and the second sampled data point corresponding to another sample of the comparator output signal in response to at least one of the strobe signals such that the sampled data points correspond to samples of the input signal that are within the pulse-width of the input signal.

10. A clock free apparatus as in claim 9, wherein the condition of the input signal is an over-amplitude condition when the first sampled data point indicates a first logic level and the second sampled data point indicates the first logic level, and condition of the input signal is an under-amplitude condition when the first sampled data point indicates a second logic level that is different from the first logic level and the second sampled data point indicates a second logic level.

11. A clock free apparatus as in claim 9, wherein the condition of the input signal is an over-shoot condition when the first sampled data point indicates a first logic level and the second sampled data point indicates a second logic level that is different from the first logic level, and the condition of the input signal is an under-shoot condition when the first sampled data point indicates a second logic level and the second sampled data point indicates the first logic level for the persistent time interval.

12. A clock free apparatus as in claim 1, further comprising:
an equalizer circuit that produces an equalized signal in response to a received signal; and
a data slicer circuit that produces the input signal in response to the equalized signal, the input signal corresponding to a digital representation the of the equalized signal.

13. A clock free method for sampling an input signal that has a pulse-width defined between a first edge and a second edge, comprising:
comparing the input signal to a peak level signal to produce a comparator output signal;
generating a first and second timing signal from the input signal, wherein the first and second timing signals are within the pulse-width of the input signal;
sampling a first data point from the comparator output in response to the first timing signal;
sampling a second data point from the comparator output in response to the second timing signal, wherein the first and second data points correspond to sample points that are within the pulse-width of the input signal.

14. A clock free method as in claim 13, sampling the first data point further comprising:
triggering a first memory circuit in response to the comparator output signal;
resetting the first memory circuit in response to the second timing signal;
coupling an output of the first memory circuit to an input of a second memory circuit;
triggering the second memory circuit in response to the first timing signal;
coupling an output of the second memory circuit to an input of a third memory circuit; and
triggering the third memory Circuit in response to the second timing signal such that an output of the third memory circuit corresponds to the first data point.

15. A clock free method as in claim 13, sampling the second data point further comprising triggering a memory circuit in response to the second timing signal such that an output of the memory circuit follows the comparator output signal when triggered, the output of the memory circuit corresponding to the second data point.

16. A clock free method as in claim 14, further comprising resetting the first, second, and third memory circuit in response to a reset control signal.

17. A clock free system for sampling an input signal that has a pulse-width defined between a first edge and a second edge, comprising:
a means for producing data produces a data signal in response to the input signal, the data signal corresponding to a digital representation of the input signal;
a means for producing a first timing signal produces a first timing signal in response to the data signal, wherein the first timing signal is a pulse that occurs a first time delay after a change in the data signal between a logic state and an other logic state;
a means for producing a second timing signal produces a second timing signal in response to the data signal, wherein the second timing signal is a pulse that occurs a second time delay after the data signal changes from the logic state to the other logic state, and the pulses of the first timing signal and the second timing signal are within the pulse-width of the input signal;
a means for comparing produces a comparator output signal in response to a comparison between the input signal and a reference level signal; and
a means for sampling data points produces a first sampled data point in response the comparator output signal and the first and second strobe signals, the means for sampling also produces a second sampled data point in response to the comparator output signal and at least one of the first and second strobe signals, wherein the first and second sampled data points correspond to sampled data points within the pulse-width of the input signal.

18. A clock free system as in claim 17, the means for sampling data points further comprising a means for triggering a fourth memory circuit in response to the second timing signal such that an output of the fourth memory circuit follows the comparator output signal when triggered, the output of the fourth memory circuit corresponding to the second data point.

19. A clock free system as in claim 18, the means for sampling data points further comprising:
a means for triggering a first memory circuit in response to the comparator output signal;
a means for resetting the first memory circuit in response to the second timing signal;
a means for coupling an output of the first memory circuit to an input of a second memory circuit;
a means for triggering the second memory circuit in response to the first timing signal;
a means for coupling an output of the second memory circuit to an input of a third memory circuit; and
a means for triggering the third memory circuit in response to the second timing signal such that an output of the third memory circuit corresponds to the first data point.

20. A clock free system as in claim 19, further comprising a means for resetting the means for comparing in response to the first timing signal.

* * * * *

UNITED STATES PATENT AND TRADEMARK OFFICE
CERTIFICATE OF CORRECTION

PATENT NO. : 6,880,099 B1
DATED : April 12, 2005
INVENTOR(S) : Hai Thanh Nguyen et al.

It is certified that error appears in the above-identified patent and that said Letters Patent is hereby corrected as shown below:

Column 8,
Line 23, "reset signal (706, RS1)." should read -- reset signal (706 RST) --.

Column 10,
Line 47, "Since many embodiment" should read -- Since many embodiments --.
Line 58, "pulse width that are" should read -- pulse width that is --.

Column 11,
Line 37, "a timing delay circuit is arranged" should read -- a timing delay circuit arranged --.
Line 41, "a comparator circuit is arranged" should read -- a comparator circuit arranged --.
Line 44, "a sampling logic is arranged" should read -- a sampling logic arranged --.

Column 12,
Line 29, "a timing delay circuit is arranged" should read -- a timing delay circuit arranged --.
Line 33, "a comparator circuit is arranged" should read -- a comparator circuit arranged --.
Line 36, "a sampling logic is arranged" should read -- a sampling logic arranged --.

Column 13,
Line 9, "a digital representation the of" should read -- a digital representation of --.

Column 14,
Line 5, "and an other logic" should read -- and another logic --.
Line 18, "data point in response the" should read -- data point in response to the --.

Signed and Sealed this

Sixteenth Day of August, 2005

JON W. DUDAS
*Director of the United States Patent and Trademark Office*